(12) United States Patent
Hashizumi et al.

(10) Patent No.: US 7,143,724 B2
(45) Date of Patent: Dec. 5, 2006

(54) POWER SUPPLY DEVICE FOR VEHICLE

(75) Inventors: Kazuki Hashizumi, Kasai (JP); Hideo Shimizu, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 105 days.

(21) Appl. No.: 11/202,271

(22) Filed: Aug. 12, 2005

(65) Prior Publication Data

US 2006/0036883 A1  Feb. 16, 2006

(30) Foreign Application Priority Data

Aug. 16, 2004  (JP)  ............................... 2004-236579

(51) Int. Cl.
*F01P 1/06* (2006.01)
*B60K 11/06* (2006.01)

(52) U.S. Cl. .................... 123/41.56; 429/120

(58) Field of Classification Search .. 123/41.55–41.59, 123/142.5 E; 429/62, 120; 180/65.8, 68.1; 165/43; 237/12.3 B
See application file for complete search history.

(56) References Cited

U.S. PATENT DOCUMENTS

| | | | | |
|---|---|---|---|---|
| 1,363,889 A | * | 12/1920 | Linebarger | .................. 165/259 |
| 5,490,572 A | * | 2/1996 | Tajiri et al. | ................. 180/65.1 |
| 5,549,153 A | * | 8/1996 | Baruschke et al. | ............ 165/42 |
| 5,647,534 A | * | 7/1997 | Kelz et al. | ............. 237/12.3 B |
| 6,059,197 A | * | 5/2000 | Kurahashi et al. | ..... 237/12.3 R |
| 6,138,466 A | * | 10/2000 | Lake et al. | .................... 62/199 |
| 6,148,910 A | * | 11/2000 | Warner | ........................ 165/297 |
| 6,357,541 B1 | * | 3/2002 | Matsuda et al. | ............ 180/68.2 |
| 6,481,230 B1 | * | 11/2002 | Kimishima et al. | ........... 62/239 |
| 6,840,050 B1 | * | 1/2005 | Pode | .......................... 62/3.61 |
| 2003/0082438 A1 | * | 5/2003 | Kwon | ........................ 429/120 |
| 2003/0118891 A1 | * | 6/2003 | Saito et al. | .................... 429/62 |
| 2003/0162064 A1 | * | 8/2003 | Colborn | ....................... 429/26 |
| 2006/0060236 A1 | * | 3/2006 | Kim | .......................... 136/203 |

FOREIGN PATENT DOCUMENTS

| | | |
|---|---|---|
| JP | 7-73906 | 3/1995 |
| JP | 10-284137 | * 10/1998 |
| JP | 10-297570 | * 11/1998 |
| JP | 2003-203679 | 7/2003 |

\* cited by examiner

*Primary Examiner*—Hai Huynh
(74) *Attorney, Agent, or Firm*—Wenderoth, Lind & Ponack, L.L.P.

(57) ABSTRACT

A power supply device for a vehicle, for driving a motor which is mounted on a vehicle and makes the vehicle travel. The power supply device for a vehicle includes: a battery unit having a plurality of secondary batteries; a battery temperature sensor for detecting the temperature of a secondary battery; a heat insulating mechanism for controlling the temperature of the secondary battery; an outside air temperature sensor for detecting the temperature of air outside of the vehicle; an air intake port for taking the outside air to the battery unit in the vehicle; an intake valve for opening/closing the intake port; and a temperature controller for controlling the opening/closing of the intake valve on the basis of the temperature difference between the outside air temperature detected by the outside air temperature sensor and the battery temperature detected by the battery temperature sensor.

13 Claims, 4 Drawing Sheets

POWER SUPPLY DEVICE FOR VEHICLE

BACKGROUND OF THE INVENTION

1. Field of the Invention

The present invention relates to a power supply device for driving a motor, which is mounted on a vehicle having a motor for making the vehicle travel and, more particularly, to a power supply device for a vehicle, for efficiently controlling temperature of a battery included in the power supply device.

2. Description of the Related Art

Vehicles such as an electric vehicle and a hybrid vehicle are used in extremely hostile temperature environment. In summer, a vehicle is exposed to the scorching sun and the temperature becomes extremely high. In the middle of winter or the like, the temperature becomes extremely low. When the temperature is high and low, the electric performance of a power supply device built in a vehicle used in the environment deteriorates. Specifically, when the temperature is low, the dischargeable capacity of a battery included in the power supply device decreases. On the other hand, when the temperature is high, the self discharge increases and the remaining capacity decreases. To prevent such a problem, a heat exchanger for cooling and heating the battery is provided and the temperature of the battery is controlled to be in a predetermined temperature range.

When a heat exchanger dedicated to a battery is provided to perform temperature control, however, the energy is consumed by the amount corresponding to the temperature control, and the use efficiency of the battery deteriorates. Consequently, a mechanism in which an air conditioner unit for adjusting the temperature in a vehicle is used for adjusting battery temperature has been developed (Japanese Patent Publication Laid-open No. Hei 7-73906). With the configuration, cold air from the air conditioner for cooling the room is used also for cooling the battery. However, the output of the air conditioner is consumed, not only for cooling the room, but also for cooling the battery, so that general power consumption of the air conditioner increases and the energy is consumed.

The applicant of the present invention has developed a power supply device for a vehicle (Japanese Patent Publication Laid-open No. 2003-203679), in which the temperature of the outside air is detected in a state where an ignition switch is off. Only when the temperature of the outside air is out of a set temperature range, a temperature control circuit determines a temperature control mode in which a battery unit is subjected to temperature control. An input circuit selects the temperature control mode of controlling the temperature of the battery unit, and the temperature of the battery unit is controlled by a heat insulating mechanism. On the other hand, when the input circuit selects a state in which the battery unit is not set in the temperature control mode even if the outside air temperature lies out of the set temperature range, the battery unit is not subjected to the temperature control. With this configuration, the user determines finally and executes the temperature control on the battery unit. Consequently, while suppressing excessive battery consumption, the battery can be protected from the high and low temperatures even in the state in which the ignition switch is off. However, in this configuration as well, the power of the power supply device is consumed for controlling the temperature of the battery, so that the energy efficiency is low. Consequently, a technique capable of improving the use efficiency of the battery by further suppressing power consumption is in demand.

SUMMARY OF THE INVENTION

The present invention has been achieved to solve such problems. A main object of the invention is to provide a power supply device for a vehicle, which is capable of suppressing power consumption required for a control for protecting a battery.

To achieve the object, the present invention provides a power supply device for a vehicle, for driving a motor which is mounted on a vehicle and makes the vehicle travel, including: a battery unit having a plurality of secondary batteries; a battery temperature sensor for detecting temperature of a secondary battery included in the battery unit; a heat insulating mechanism for controlling the temperature of the secondary battery; an outside air temperature sensor for detecting the temperature of the air outside of the vehicle; an intake port for taking the outside air to the battery unit in the vehicle; an intake valve for opening/closing the intake port; and a temperature controller for controlling the opening/closing of the intake valve on the basis of the temperature difference between the outside air temperature detected by the outside air temperature sensor and the battery temperature detected by the battery temperature sensor. With this configuration, the battery temperature can be adjusted by opening/closing the intake valve in accordance with the temperature of the outside air. Thus, energy for cooling/heating the battery for protecting the battery is saved, so that the power supply device improves fuel consumption, and efficient battery temperature control can be realized.

In the power supply device for a vehicle according to the invention, when the temperature of the outside air is lower than the battery temperature by a predetermined value, the temperature controller performs a temperature control so that the battery temperature is set to a predetermined temperature range by opening the intake valve, and when the temperature of the outside air is higher than the battery temperature by a predetermined value, the temperature controller performs a temperature control so that the battery temperature is set to the predetermined temperature range by closing the intake valve and driving the heat insulating mechanism. By the control, whether the battery can be cooled with the outside air or not is determined on the basis of the difference between the outside air temperature and the battery temperature. In the case where the battery can be cooled with the outside air, the intake port is opened and the battery can be cooled with the outside air. Thus, energy for cooling/heating the battery is saved, so that the power supply device improves fuel consumption, and efficient battery temperature control can be realized.

Further, in the power supply device for a vehicle according to the invention, the heat insulating mechanism also serves as an air conditioning unit for adjusting the temperature in the interior of the vehicle. With this configuration, the air conditioning unit for adjusting the temperature in the interior of the vehicle can be used for cooling the battery. The configuration can be simplified, and the energy for operating the air conditioner is used efficiently to enable energy efficiency to be improved.

Further, in the power supply device for a vehicle according to the invention, a pipe for circulating a refrigerant included in the air conditioning unit for adjusting the temperature in the interior space of the vehicle extends to a cooling path in the battery unit, and the refrigerant circulation path can be switched between circulation of the air conditioning unit and circulation of the cooling path in the air conditioning unit and the battery unit by a switching valve. With this configuration, the refrigerant of the air conditioning unit can be also used for cooling the battery. The configuration can be simplified and, by efficiently using the cooling energy of the air conditioner, the energy efficiency can be improved.

Further, in the power supply device for a vehicle according to the invention, temperature adjustment using the outside air and temperature adjustment by the air conditioning unit can be performed concurrently and, for a period in which the air conditioning unit is used for adjusting the temperature in the interior of the vehicle, the temperature controller performs a temperature control so as to preferentially permit circulation of a refrigerant to the battery unit. With this configuration, for a period in which the air conditioning unit for adjusting the temperature in the room of the vehicle is operating, the temperature adjustment is also used for adjusting the temperature of the battery unit. Thus, the energy efficiency can be increased.

The power supply device for a vehicle according to the invention may further include: an exhaust port for exhausting the outside air taken in from the intake port and circulated in the battery unit; and an exhaust valve for opening/closing the exhaust port. The intake port and the exhaust port for the outside air are provided separately from each other to smoothly circulate the outside air, and heat exchange can be performed efficiently.

The power supply device for a vehicle according to the invention may further include an opening sensor capable of detecting the position of an opening, which is provided for at least one of the intake valve and the exhaust valve. With this configuration, the quantity of airflow can be controlled by changing the opening area on the basis of the opening sensor. Thus, the volume of air that is taken/exhausted is adjusted by the temperature controller, and the temperature control can be performed more optimally.

In the power supply device for a vehicle according to the invention, the temperature controller performs the control when an ignition switch of the vehicle is on. It can save the energy consumption during operation of the vehicle.

The power supply device for a vehicle according to the invention further includes a filter which is provided for the intake port. With this configuration, foreign matter such as dust included in the outside air, which is taken into the vehicle, can be removed by the filter. Thus, the inside of the vehicle can be prevented from becoming dirty by the outside air.

Further, in the power supply device for a vehicle according to the invention, the intake port and the exhaust port are disposed so as to be adjacent to each other. With the configuration, the outlet and the inlet of air are disposed adjacent to each other, so that the circulation path can be made compact.

The power supply device for a vehicle according to the invention further includes a hydrogen sensor for detecting hydrogen generated from a secondary battery included in the battery unit. When hydrogen is detected by the hydrogen sensor, accordingly, a control is performed so as to open at least one of the intake valve and the exhaust valve. With the configuration, hydrogen purging can be performed concurrently with the battery temperature control, and safety can be maintained.

As described above, in the power supply device for a vehicle according to the invention, the outside air can be used for the temperature control of the battery included in the battery unit and, the outside air is used only in the case where the battery can be cooled/heated by the outside air on the basis of the temperature conditions. With this configuration, the outside air is used as much as possible. As a whole, the power necessary for the temperature control can be saved, and the power supply device can be used with high energy efficiency.

The above and further objects and features of the invention will more fully be apparent from the following detailed description along with the accompanying drawings.

DETAILED DESCRIPTION OF THE PREFERRED EMBODIMENTS

Embodiments of the present invention will be described hereinbelow with reference to the drawings. The following embodiments relate to a power supply device for a vehicle for embodying the technical ideal of the present invention, and the present invention is not limited to a power supply device for a vehicle described below. Members in the scope of the claims are not limited to those shown in the particular embodiments. Some of the sizes, positions, relations, and the like of the members shown in the diagrams are exaggerated for clear description. In the following description, the same name and reference numeral are designated to the same or similar members, and their detailed description will not be repeated. Further, with respect to components of the present invention, a plurality of components may be constructed by the same members and one component may be used as a plurality of components. On the contrary, the function of one component may be realized by a plurality of components.

Figure 1:
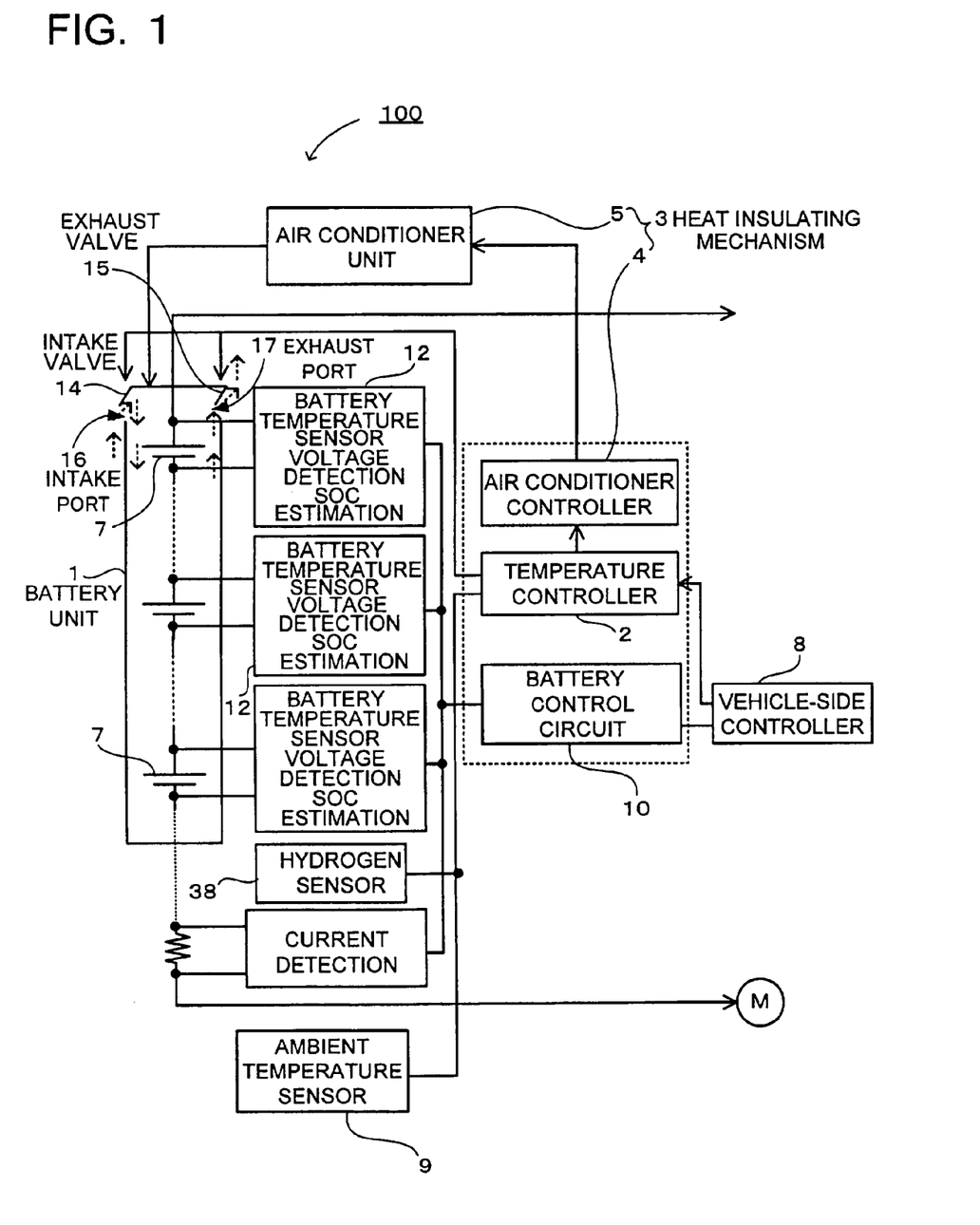
FIG. 1 is a block diagram showing a power supply device for a vehicle, according to an embodiment of the invention.

FIG. 1 is a block diagram showing the configuration of a power supply device for a vehicle according to an embodiment of the present invention. A power supply device 100 shown in the diagram is provided to drive a motor M which is mounted on a vehicle such as a car and makes the car travel, and has a battery unit 1, a temperature controller 2, a heat insulating mechanism 3, and an outside air temperature sensor 9. The heat insulating mechanism 3 has an air conditioner controller 4 and an air conditioning unit 5. The air conditioner controller 4 is controlled by the temperature controller 2, drives the air conditioning unit 5, and performs temperature control by cooling or heating the battery unit 1.

The battery unit 1 is constructed by connecting a plurality battery modules 7 in series to increase an output voltage. In the power supply device, the plurality of battery modules 7 are housed in a case and connected in series. A secondary battery as a component of the battery module 7 is a nickel-metal hydride battery. As the secondary battery, a lithium ion secondary battery, a nickel cadmium battery, or the like can be also used.

The temperature controller 2 is connected to a vehicle-side controller 8. The vehicle-side controller 8 performs communications with the temperature controller 2 and a battery control circuit 10 to request the power supply device to send necessary power and notify the temperature controller 2 of turn-off of an ignition switch. For the communications, a known method such as CAN can be used. As the vehicle-side controller 8, for example, a member called ECU "Electronic [Engine] Control Unit" can be used. The ECU is a member for determining a fuel injection amount and injection time of an engine on the basis of information from sensors provided in parts of a vehicle and includes a self diagnosing function of reporting a failure position and a function, when a failure occurs in the ECU body, of switching to a backup circuit and driving the ECU.

To the temperature controller 2, the outside air temperature sensor 9 for sensing temperature of the outside air is connected. As the outside air temperature sensor 9, a temperature sensor capable of detecting the temperature of the outside of a vehicle, such as a platinum resistance thermometer sensor, a thermistor, a thermocouple, or a thermopile can be used. For detection of the temperature of the outside air, an intake air temperature sensor can be used to measure the temperature of intake air and to report it to the ECU.

On the other hand, a battery temperature sensor 12, for sensing the battery temperature, is provided for each of the secondary batteries. Although a thermistor as a temperature sensor is used as the battery temperature sensor 12, a temperature sensor other than the thermistor can be also used. The battery temperature sensor 12 shown in FIG. 1 is a composite sensor capable of detecting not only battery temperature but also battery voltage. The battery temperature sensor 12 can further detect an amount of current passing to the battery unit 1 and estimate the state of charge (SOC). In the example of FIG. 1, the battery temperature sensor 12 is provided for each of the batteries. It is also possible to provide a battery temperature sensor for plural batteries. As the battery temperature, not only the value of the temperature of each of batteries but also a representative value such as an average value of each battery temperature can be also used.

Figure 2:
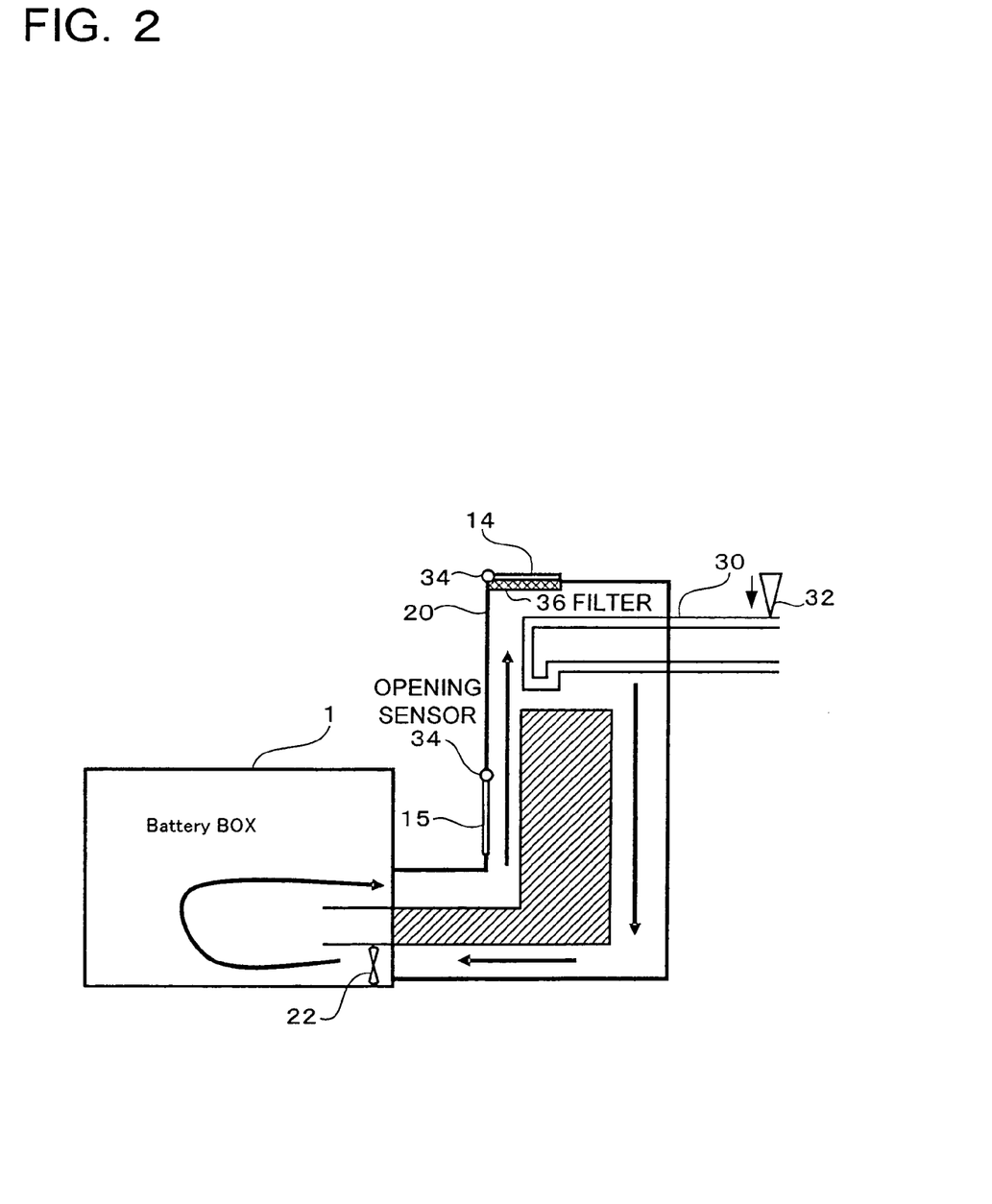
FIG. 2 is a diagram illustrating a circulation mode in which a circulation unit is connected to a battery unit and an intake valve and an exhaust valve are closed.
Figure 3:
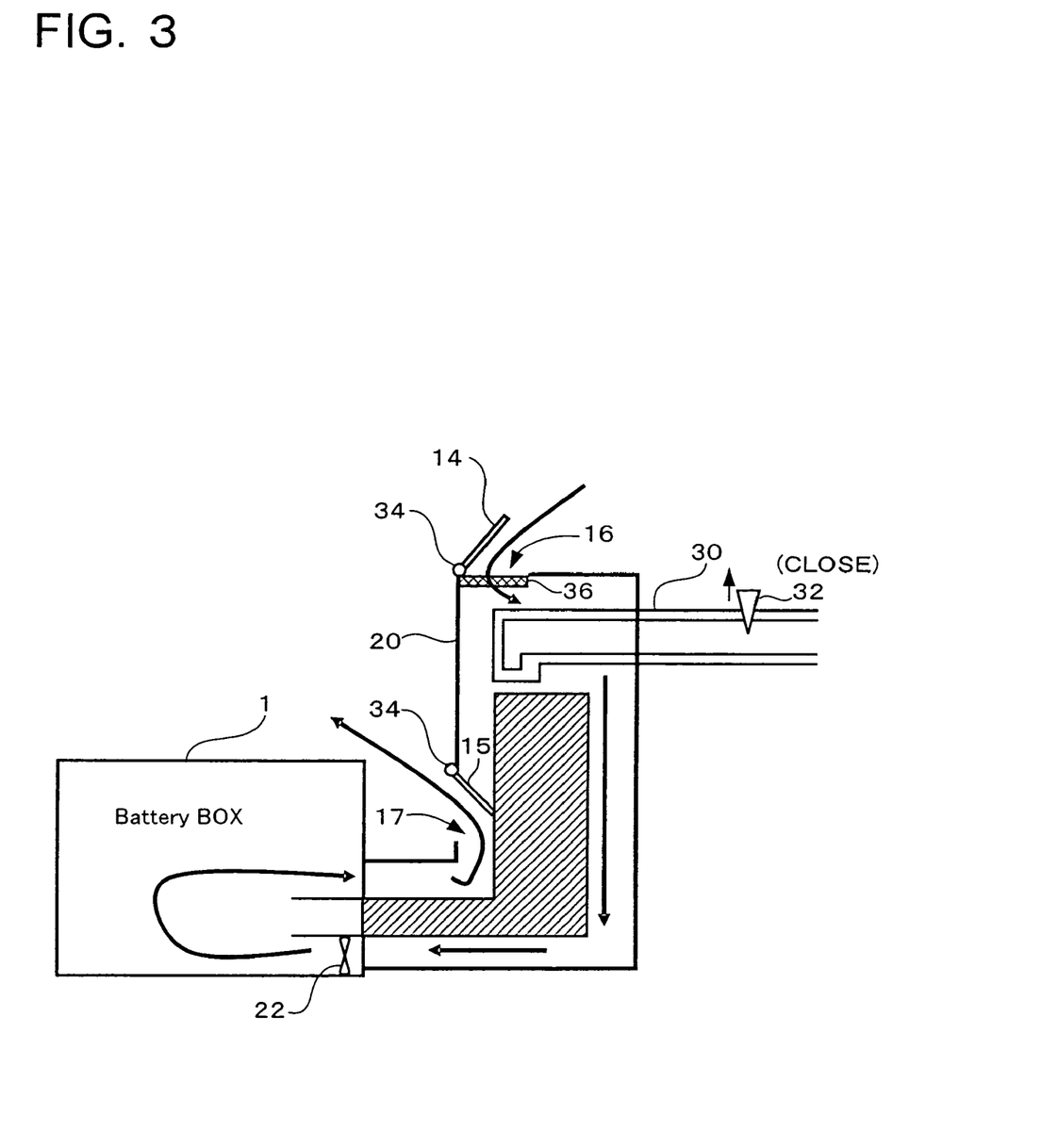
FIG. 3 is a diagram illustrating an outside air temperature mode in which the intake valve and the exhaust valve shown in FIG. 2 are open.

The temperature controller 2 receives the temperature of the outside air from the outside air temperature sensor 9 and battery temperature from the battery temperature sensor 12 and, on the basis of the detected temperatures, controls the heat insulating mechanism 3 to hold the battery temperature within a predetermined range. Simultaneously, as shown in FIGS. 2 and 3, the temperature controller 2 drives an intake valve 14 and an exhaust valve 15 to open an intake port 16 and an exhaust port 17, so that the temperature controller 2 also performs temperature adjustment by using the outside air. As described above, by combining passive temperature control using the outside air to the active temperature control by a heat insulating mechanism, the power consumption necessary for temperature control as a whole is suppressed, and the efficiency of the power supply device can be improved. Although the temperature controls are performed independently of each other, they can be also performed interlockingly.

A state where the temperature controller 2 opens/closes the intake valve 14 and the exhaust valve 15 will be described with reference to FIGS. 2 and 3. In the diagrams, a circulation unit 20 for supplying and circulating outside air is connected to the battery unit 1, circulating paths of the circulation unit 20 and the battery unit 1 are coupled to each other, and the flows of a refrigerant for cooling and air flowing in the circulating paths are shown. FIG. 2 shows a state of a circulation mode in which both of the valves are closed, and FIG. 3 shows a state of an outside air mode of taking the outside air by opening both of the valves. As shown in the diagrams, the battery unit 1 has a circulation path in which air is circulated and an air fan 22 disposed in the circulation path. An end part of the circulation path in the battery unit 1 is opened to the case, and the battery unit 1 is connected to the circulation unit 20 so that the open end is connected to a refrigerant circulation path in the heat insulating mechanism 3. The air fan 22 adjusts air volume by its number of revolutions or speed. By adjusting the number of revolutions of the air fan 22 by PWM control on the basis of the drive speed of the vehicle, engine speed of the engine, and the like, discomfort caused by noise can be also reduced. The open end which is open to the case of the battery unit 1 is separated into an intake side and an exhaust side. In the example of FIGS. 2 and 3, the lower part of the open end is set as the intake side, and the upper part of the open end is set as the exhaust side. In the diagrams, in the circulation unit 20, which is connected to the right side of the battery unit 1, the circulation path for passing air clockwise is formed and a refrigerant pipe 30 facing the circulation path and circulating a refrigerant is disposed.

The refrigerant pipe 30 is constructed of an aluminum tube or the like having high thermal conductivity so that the refrigerant is circulated and cooled by thermal exchange with the inner face of the hollow. The refrigerant pipe 30 is, preferably, commonly used as a compressor, a heat exchanger and a refrigerant pipe in the air conditioning unit 5 for air-conditioning the compartment of a vehicle and is obtained by extending the refrigerant pipe for the air conditioner in the circulation unit 20. The refrigerant circulation path can be switched by a switch valve between the refrigerant circulation path only for air-conditioning the room and a path for air-conditioning the room and cooling the circulation unit 20. With this configuration, in the case where only air conditioning in the room is necessary, by omitting cooling of the circulation unit 20, the refrigerant pipe 30 can be used with high energy efficiency. It is also possible to switch the pipe so as to perform only cooling of the circulation unit 20. Alternately, a refrigerant pipe different from that in the air conditioner can be also provided. In the example of FIGS. 2 and 3, an electromagnetic valve 32 is disposed in a path of the refrigerant pipe 30. By opening the electromagnetic valve 32, the refrigerant may be supplied to the circulation unit 20 to cool the circulation unit 20. By closing the electromagnetic valve 32, the refrigerant is not supplied to the circulation unit 20 and cooling is not performed.

To the circulation path in the circulation unit 20, the intake port 16 and the exhaust port 17 communicated with the outside of the vehicle are open, and the intake valve 14 and the exhaust valve 15 are provided so that their openings can be selectively open/closed. As shown in FIG. 3, the intake port 16 is open on the upstream side facing the refrigerant pipe 30, and the exhaust port 17 is open on the downstream side far from the refrigerant pipe 30. In a state where the exhaust valve 15 is open, the path in the circulation unit 20 is closed to exhaust the intake air to the outside. In this arrangement, particularly, when the refrigerant circulates in the refrigerant pipe 30, the outside air taken from the outside is subjected to heat exchange by the refrigerant pipe 30 to become cold air. The cold air circulates also in the battery unit 1 so that air including waste heat can be discharged to the outside. Each of the intake valve 14 and the exhaust valve 15 is opened/closed by a driving unit such as a door motor (not shown). In the example of FIG. 3, the intake valve 14 and the exhaust valve 15 are arranged so as to pivot into the open/close position. Alternately, each of the intake valve 14 and the exhaust valve 15 may take the form of biparting doors, a slide, a shutter, or the like. The driving unit is controlled by the temperature controller 2. The temperature controller 2 controls the opening/closing of the intake valve 14 and the exhaust valve 15 on the basis of the temperature of the outside air and the battery temperature. The opening/closing of the intake valve 14 and the exhaust valve 15 is not limited to a complete opening/closing position. The air volume can be controlled by opening the intake valve 14 and the exhaust valve 15 by 50%.

In the circulation mode of FIG. 2, both the intake valve 14 and the exhaust valve 15 are closed, the air fan 22 in the battery unit 1 is driven, and the electromagnetic valve 32 is opened to make the refrigerant flow. The circulation path in the battery unit 1 and the circulation unit 20 is used as a closed space in which the air is circulated, and heat of the circulating air is taken by the refrigerant pipe 30 of the heat insulating mechanism to realize cooling. In this state, the battery is cooled by the action of the refrigerant. On the other hand, in the outside air mode of FIG. 3, both the intake valve 14 and the exhaust valve 15 are opened, the air fan 22 in the battery unit 1 is driven, and the electromagnetic valve 32 is closed to stop the circulation of the refrigerant. The outside air from the intake port 16 is passed to the circulation path in the battery unit 1 and the circulation unit 20, and the outside air heated by heat exchange is exhausted from the exhaust port 17. In this state, cooling is performed only with the outside air without using the refrigerant, so that energy consumption of the power supply device may be low. It is also possible to perform cooling with a combination of the cooling with the refrigerant and the cooling by circulation of outside air. Although the example of performing cooling has been described above, the same configuration can be employed for heating the battery. Although the case of cooling is described mainly in the specification, the invention can be similarly applied to heating and the heating will not be described.

The door motor can be provided with an opening sensor 34 capable of detecting the opening position of each of the intake valve 14 and the exhaust valve 15. The opening sensor 34 can detect an opening angle and determine opening area on the basis of the opening angle. Accordingly, the opening angle is adjusted by the door motor. By detecting the opening angle, the quantity of airflow can be controlled. Consequently, by adjusting the volume of air to be taken/exhausted by the temperature controller 2, the optimum temperature control can be performed. In particular, in the case where the difference between the battery temperature and the temperature of the outside air is conspicuous, it is not preferable to cause a sharp temperature change in the battery. Consequently, in such a case, by regulating the quantity of airflow, the temperature is controlled to gradually decrease/increase. For example, in the case where the temperature of the outside air is extremely low such as −30° C. and the battery temperature is high such as 35° C., if the intake port is opened 100% to introduce the outside air, a sharp temperature change occurs, and an adverse influence is exerted on the system like variations in the battery temperature. In such a case, by setting the opening ratio to about 30% to suppress the volume of outside air flowing in the battery unit 1, the temperature can be adjusted to the optimum temperature for cooling. In the case where the temperature of the outside air is as high as 40° C., it is humid, and the battery temperature is low, if the intake port is opened 100% to introduce the outside air, there is the possibility of the occurrence of condensation. Also in such a case, the opening ratio is suppressed and the temperature is controlled so as to gradually increase, so that an adverse influence on the battery can be prevented. Although the opening sensor 34 is provided for each of the intake valve 14 and the exhaust valve 15 in this case, it is also possible to provide the opening sensor 34 only for the intake valve or the exhaust valve.

A filter 36 is disposed for the intake port 16. The filter 36 is disposed so as to cover the section of the intake path from the intake port, so that the filter 36 will remove foreign matter such as dust that is included in the outside air which is taken into the vehicle. By the filter 36, the inside of the vehicle can be prevented from becoming dirty due to the outside air. The filter 36 is detachable. By replacing the filter 36 periodically, a decrease in the volume of air due to clogging of the filter 36 can be avoided. A function of cleaning the filter 36 may be added. For example, as a filter cleaning mode, a method of removing dust clogged in the filter by inversely rotating the fun can be employed.

Preferably, the intake port 16 and the exhaust port 17 are disposed so as to be adjacent to each other. With this arrangement, the entrance and exit of the circulation path of the outside air are adjacent to each other, so that the configuration can be simplified. For example, an opening portion which opens to the outside of the vehicle can be easily connected.

Referring again to FIG. 1, the configuration of the power supply device 100 will be described. The power supply device 100 has the battery control circuit 10 for controlling charging/discharging of the battery unit 1. The battery control circuit 10 performs communications with the vehicle-side controller 8 and charges/discharges the battery unit 1. In the example of FIG. 1, the temperature controller 2 is provided as a circuit that is separate from the battery control circuit 10. A battery controller, which is mounted on a vehicle and controls charging/discharging of a battery unit, may also serve as the temperature controller 2. Further, the air conditioner controller 4, the temperature controller 2, and the battery control circuit 10 shown in FIG. 1 can be realized by a single computing circuit such as a CPU or an MPU.

Under the control of the temperature controller 2, the heat insulating mechanism 3 controls the temperature by cooling or heating the battery unit 1. The heat insulating mechanism 3 is constructed by the air conditioner controller 4 and the air conditioning unit 5 for cooling or heating the battery unit 1 under control of the air conditioner controller 4. The air conditioning unit 5 for cooling the battery unit 1 cools the battery unit 1 by an air conditioner mounted on the vehicle. The air conditioning unit 5 for heating the battery unit 1 is a heater disposed close to the battery unit 1 for heating air to be blown. By using the air conditioning unit also as the heat insulating mechanism for heating/cooling the battery, the number of parts is decreased and the space efficiency and the energy efficiency can be improved. The heat insulating mechanism can be also constructed by, aside from the air conditioning unit, a cooling fan for forcedly blowing cooling air to the battery unit.

Figure 4:
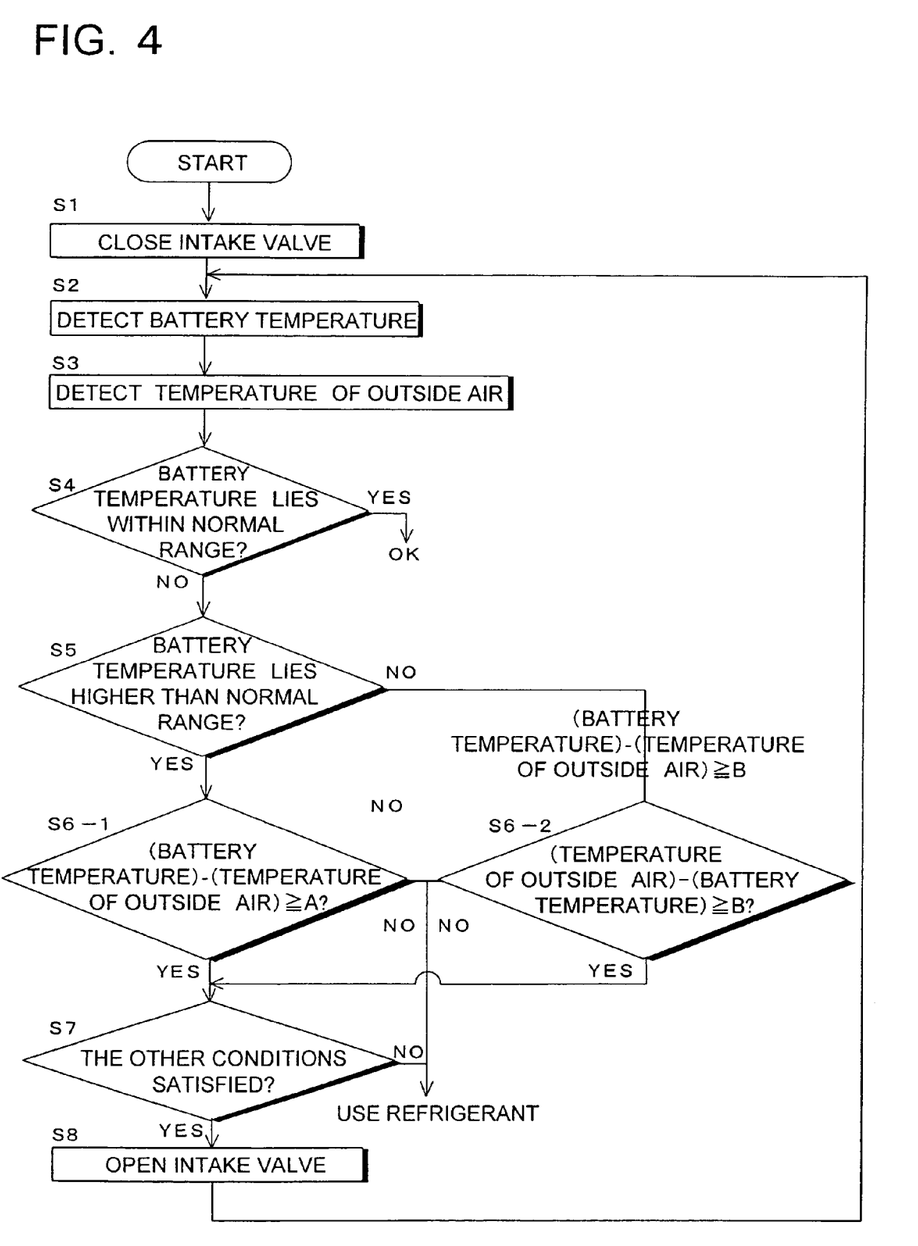
FIG. 4 is a flowchart showing the procedure of controlling temperature of a battery on the basis of the temperature of the outside air and the battery temperature.

Next, the procedure of performing cooling with the outside air on the basis of the difference between the temperature of the outside air and the battery temperature by the temperature controller 2 will be described on the basis of the flowchart of FIG. 4. First, in step S1, the temperature controller 2 drives the door motor to close the intake valve 14 and the exhaust valve 15, and sets the circulation mode. In step S2, the battery temperature is detected by the battery temperature sensor 12. In step S3, the temperature of the outside air of the vehicle is detected by the outside air temperature sensor 9. The temperatures are sent to the temperature controller 2. In step S4, whether the battery temperature lies within a normal range or not is determined. In the normal case, it is unnecessary to adjust the temperature, so that the process is finished, or the program returns to step S1 to cause the next loop iteration.

In the case where the battery temperature lies out of the normal range, the program advances to step S5 and determines whether the battery temperature is higher than the normal range or not. When the battery temperature is higher than the normal range, the program advances to step S6-1 and determines whether or not the temperature difference obtained by subtracting the temperature of the outside air from the battery temperature is equal to or higher than a predetermined value A. When the temperature difference is equal to or higher than the predetermined value A, it is determined that the outside air can be used. When the temperature difference is lower than the predetermined value A, it is determined that the outside air cannot be used. As described above, when the temperature of the outside air is lower than the battery temperature by the predetermined value A or larger, the battery can be cooled by the outside air. The predetermined value A denotes here the temperature difference by which a sufficient effect capable of cooling the battery with the outside air can be obtained and which is set to, for example, 5° C. to 10° C. The predetermined value A can be varied according to the battery temperature and the temperature of the outside air.

On the other hand, when it is determined in step S5 that the battery temperature is not higher but is lower than the normal range, the program advances to step S6-2 and determines whether or not the temperature difference obtained by subtracting the battery temperature from the temperature of the outside air is equal to or higher than a predetermined value B. When the temperature difference is equal to or higher than the predetermined value B, it is determined that the outside air can be used. When the temperature difference is lower than the predetermined value B, it is determined that the outside air cannot be used. As described above, when the temperature of the outside air is higher than the battery temperature by the predetermined value B or larger, the battery can be heated by the outside air. The predetermined value B denotes here the temperature difference by which a sufficient effect of heating the battery with the outside air can be obtained and which is set to, for example, 4° C. to 8° C. The predetermined value B can be varied according to the battery temperature and the temperature of the outside air. Alternately, the predetermined value B can be set to the same value as the predetermined value A.

Whether the outside air has the temperature at which the outside air is usable or not on the basis of its temperature relative to the battery temperature is determined as described above. When the outside air cannot be used, the program moves to the mode of cooling or heating the battery with the refrigerant. On the other hand, when it is determined that the outside air has the temperature at which the outside air is usable, the program advances to step S7 and determines whether the other conditions are satisfied or not. The other conditions are conditions under which the outside air can be used except for the condition of the temperature difference. According to the conditions, whether the intake port 16 and the exhaust port 17 may be opened or not is determined. The battery controller performs communication with the vehicle-side controller 8 to obtain necessary information, and the determination is made. For example, when the gear of the vehicle is in the parking or neutral position, there is the possibility that the vehicle is being washed. It is not preferable to open the intake port 16 or the exhaust port 17 in this case because there is the possibility that water will enter from the port. Consequently, it is determined that the intake port 16 and the exhaust port 17 are not opened, that is, the outside air cannot be used. Similarly, when a wiper is moving, the possibility that it is raining is high. In this case as well, it is also determined that the outside air cannot be used, and the door motor is not driven. On the other hand, when the air conditioner in the vehicle is working, the compressor has been already operating for circulating the refrigerant. Accordingly, if the air conditioner is used for cooling the battery unit, energy loss will be small. A control may be performed so as to preferentially use cooling with the refrigerant rather than cooling with the outside air when the air conditioner is in operation. On the contrary, when the air conditioner is not in operation, a control is performed so as not to permit the use of the air conditioner until the air conditioner becomes necessary to avoid use of the air conditioner for the purpose of cooling the battery unit as much as possible. Thus, useless energy consumption can be suppressed. For such a control, a method of providing steps or levels for temperature and making a setting of whether the air conditioner can be used or not at each of the steps can be used. For example, when the battery temperature is a first temperature (for example, 30° C.), in the case where the air conditioner is operating for air conditioning the vehicle interior, use of the air conditioner also for cooling of the battery unit is allowed. However, in the case where the air conditioner is not operating, the use is not permitted. When the battery temperature rises to a second temperature (for example, 35° C.) higher than the first temperature, the air conditioner is operated to cool the battery unit irrespective of whether the air conditioner is operating for air-conditioning the vehicle interior or not. By changing permission of the use of the air conditioner in accordance with the battery temperature, that is, the necessity of temperature adjustment, the air conditioner is not used for the purpose of cooling the battery unit unless it is necessary to improve fuel consumption. On the other hand, when the air conditioner is already being used for air-conditioning the interior space of the vehicle, by positively using adjustment of temperature of the battery unit, the air conditioner can be used without waste, and efficient temperature control can be performed.

In view of the conditions as described above, the temperature controller 2 finally determines whether the outside air can be used or not. In the case where the outside air is not used, in a manner similar to the above, the program moves to the mode of cooling the battery with the refrigerant or heating the battery. In this case, as shown in FIG. 2, the intake port 16 and the exhaust port 17 are closed and the electromagnetic valve 32 is opened to cool the circulation air with the refrigerant. By circulating the cooled air with the air fan 22, the battery in the battery unit 1 is cooled down. Also after the program moves to the mode using the refrigerant, after a lapse of a predetermined time, the loop is executed and whether the temperature of the outside air becomes usable or not in relation to the battery temperature is determined. If the outside air becomes usable, the refrigerant mode can be shifted to the outside air mode. Thus, energy consumption with the refrigerant can be minimized.

When it is determined that the outside air can be used, the program advances to step S8 where the temperature controller 2 makes the door motor operate to move the intake valve 14 and the exhaust valve 15. As shown in FIG. 3, the intake port 16 and the exhaust port 17 are opened and the electromagnetic valve 32 is closed to stop the supply of the refrigerant. The air fan 22 is rotated, the outside air is passed into the circulation path to cool the battery in the battery unit 1, and the outside air is exhausted from the exhaust port 17. The program returns to step S2 where the battery temperature is detected. When the battery temperature lies within the normal range in step S4, the process is finished or the program returns to step S1 to cause the next loop iteration.

The valves are not left open after the use of the outside air. When the battery temperature reaches the predetermined temperature range, the intake valve 14 and the exhaust valve 15 are operated to close the intake port 16 and the exhaust port 17 so that the cooling is not further performed by the outside air. The operation avoids problems such as the battery is cooled more than necessary, a charge electricity amount becomes insufficient due to low-temperature charging, and the travel distance per charging is shortened in an electric car. As described above, by maintaining the temperature of the battery in the proper range, the charge amount is maintained properly, and deterioration in the battery performance is suppressed. Thus, the battery life can be made longer. By making the outside air circulate to uniformly cool the battery in the battery unit, variations in the characteristics due to nonuniformity of cooling of each of the batteries are also suppressed. Further, by controlling the battery temperature without using the air conditioner, the fuel consumption can be improved.

Although only cooling with the outside air has been described in the above example, cooling with a refrigerant may be performed simultaneously. In the case where the cooling with a refrigerant is performed simultaneously, the cooling speed increases, so that the time required to set the battery temperature in a normal range can be shortened. On the other hand, the cooling with a refrigerant consumes energy of the power supply device, so that a control may be performed so as to suppress or interrupt, for example, the cooling with a refrigerant during cooling with the outside air. It is also possible to provide steps or levels for the temperature range. For example, when the temperature reaches an extremely high or low temperature range, even during cooling with the outside air, the temperature controller may perform a control of simultaneously performing the cooling with a refrigerant. After the temperature reaches a safe range, the temperature controller switches the operation to only perform cooling with the outside air. Alternately, another control of efficiently using energy can be also employed in which, when an air conditioner is operated in a vehicle, concurrent use of the cooling with a refrigerant is permitted. When the air conditioner is off, except for a special state, only the cooling with the outside air is performed. In such a manner, the control is performed so as to preferentially use the refrigerant when the air conditioner is in operation and so as not to perform the refrigerant circulation for cooling the battery unit when the air conditioner is not in operation, and efficiently uses energy.

Although the outside air is used for cooling, that is, the control of opening/closing the intake port 16 and the exhaust port 17 is performed on the basis of the battery temperature and the outside air temperature in the above embodiment, a control in which ejection of hydrogen is also considered on the basis of the remaining capacity of the battery can be also performed. Specifically, in the power supply device using a nickel-metal hydride battery, hydrogen may be produced due to excessive charging, excessive discharging, abnormal heating, or the like. Hydrogen gas should not remain in the vehicle but has to be released to the outside. Consequently, the battery control circuit 10 and/or the temperature controller 2 estimate the remaining capacity of the battery on the basis of the battery temperature and voltage detected by a battery voltage sensor and the like and prevent the occurrence of hydrogen. When there is the possibility that hydrogen is being generated or on the basis of an actual hydrogen gas detection, a purging operation for ejecting the hydrogen gas to the outside of the vehicle is executed. Specifically, the exhaust port 17 and the intake port 16 are opened and, further, the air fan 22 is rotated to release the air in the battery unit 1 to the outside of the vehicle. It is sufficient to execute the purging operation for a time in which the air can be changed sufficiently. The time is set to, for example, 5 to 20 seconds in accordance with the capacity of the battery unit 1, the air volume of the air fan 22, and the like. The purging operation can be also executed periodically at predetermined time intervals. Since a control on such a hydrogen purging operation is also important like the control on the temperature of the battery, it is desirable to perform the control in consideration of ejection of hydrogen in addition to the viewpoint of the control on the temperature of the battery. To be specific, as shown in FIG. 1, generation of hydrogen gas is monitored by a hydrogen sensor 38 disposed in the battery unit 1 and for detecting generation of hydrogen. On the basis of the monitoring, the vehicle-side controller 8 and the temperature controller 2 control opening/closing of the intake valve 14 and the exhaust valve 15 for the hydrogen purging operation in addition to the battery temperature control. Thus, the hydrogen purging operation can be performed concurrently with the battery temperature control, and safety can be maintained.

The power supply device for a vehicle according to the present invention can be preferably applied as a power supply device of high output and heavy current, such as a power supply device for a vehicle which is a hybrid car, an electric car, or the like.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims. This application is based on Application No. 2004-236,579 filed in Japan on Aug. 16, 2004, the content of which is incorporated hereinto by reference.

What is claimed is:

1. A power supply device for driving a motor which is mounted on a vehicle and makes the vehicle travel, the power supply device comprising:
   a battery unit having a plurality of secondary batteries;
   a battery temperature sensor for detecting a temperature of at least one of the secondary batteries included in the battery unit;
   a heat insulating mechanism for controlling the temperature of the secondary batteries;
   an outside air temperature sensor for detecting the temperature of air outside of the vehicle;
   an intake port for taking in the outside air so that it can be circulated in the battery unit;
   an intake valve for opening/closing the intake port;
   an exhaust port for exhausting the outside air taken in from the intake port and circulated in the battery unit;
   an exhaust valve for opening/closing the exhaust port; and
   a temperature controller for controlling opening/closing of the intake valve and the exhaust valve on the basis of a temperature difference between the outside air temperature detected by the outside air temperature sensor and the battery temperature detected by the battery temperature sensor, wherein the intake port and the exhaust port are disposed so as to be adjacent to each other to form an air circulation path.

2. The power supply device for a vehicle according to claim 1, wherein when the temperature of the outside air is lower than the battery temperature by a predetermined value, the temperature controller performs a temperature control so that the battery temperature is set to a predetermined temperature range by opening the intake valve, and when the temperature of the outside air is higher than the battery temperature by a predetermined value, the temperature controller performs a temperature control so that the battery temperature is set to the predetermined temperature range by closing the intake valve and driving the heat insulating mechanism.

3. The power supply device for a vehicle according to claim 1, wherein the heat insulating mechanism includes an air conditioning unit for adjusting temperature in the interior of the vehicle.

4. The power supply device for a vehicle according to claim 3, wherein the air conditioning unit includes a pipe for circulating a refrigerant to adjust the temperature in the interior of the vehicle, the pipe extends into the air circulation path, and the refrigerant circulation path can be switched between circulation in the air conditioning unit and circulation in the cooling path in the air conditioning unit and the air circulation path in the battery unit by a switching valve.

5. The power supply device for a vehicle according to claim 3, wherein temperature adjustment using the outside air and temperature adjustment by the air conditioning unit can be performed concurrently and, for a period in which the air conditioning unit is used for adjusting the temperature in the interior of the vehicle, the temperature controller performs a temperature control so as to preferentially permit circulation of a refrigerant to the air circulation path of the battery unit.

6. The power supply device for a vehicle according to claim 1, further comprising an opening sensor for detecting the position of at least one of the intake valve and the exhaust valve.

7. The power supply device for a vehicle according to claim 1, wherein the temperature controller performs the control when an ignition switch of the vehicle is on.

8. The power supply device for a vehicle according to claim 1, further comprising a filter for filtering outside air as it is taken in through the intake port.

9. The power supply device for a vehicle according to claim 1, further comprising a hydrogen sensor for detecting hydrogen generated from the secondary batteries included in the battery unit, wherein when hydrogen is detected by the hydrogen sensor, accordingly, a control is performed so as to open at least one of the intake valve and the exhaust valve.

10. A power supply device for driving a motor mounted on a vehicle, the power supply device comprising:

a battery unit defining a circulation path and including a battery case and a plurality of secondary batteries disposed in the battery case, the battery case having an open end;

a fan disposed in the circulation path of the battery unit;

a plurality of battery temperature sensors for detecting temperatures of the secondary batteries in the battery unit;

an outside air temperature sensor for detecting the temperature of air outside of the vehicle;

a circulating unit defining a circulation path, the circulating unit having an intake port and an exhaust port disposed adjacent to the intake port, the circulating unit being connected to the open end of the battery case to connect the respective circulations paths to form an air circulating/recirculating path through the circulating unit and the battery unit;

an intake valve for opening/closing the intake port;

an exhaust valve for opening/closing the exhaust port to selectively exhaust air circulated through the battery unit; and a temperature controller for controlling opening/closing of the intake valve and the exhaust valve on the basis of a temperature difference between the outside air temperature detected by the outside air temperature sensor and the battery temperature detected by the battery temperature sensors, wherein, when the intake and exhaust valves are closed, the air circulating/recirculating path is closed to the outside air.

11. The power supply device for a vehicle according to claim 10, wherein the open end of the battery case is separated into an intake side and an exhaust side.

12. The power supply device for a vehicle according to claim 11, further comprising an air conditioning unit for conditioning air in an interior space of the vehicle, the air conditioning unit having a refrigerant pipe that extends into the circulation path of the circulating unit.

13. The power supply device for a vehicle according to claim 12, wherein the air conditioning unit includes a switching valve for selectively permitting refrigerant to circulate through the portion of the refrigerant pipe that extends into the circulation path of the circulating unit.

* * * * *